(12) United States Patent
Otsu

(10) Patent No.: US 10,438,459 B2
(45) Date of Patent: Oct. 8, 2019

(54) PHOTOELECTRIC SENSOR

(71) Applicant: KEYENCE CORPORATION, Osaka-shi, Osaka (JP)

(72) Inventor: Shinichiro Otsu, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 9 days.

(21) Appl. No.: 15/928,499

(22) Filed: Mar. 22, 2018

(65) Prior Publication Data
US 2018/0322744 A1 Nov. 8, 2018

(30) Foreign Application Priority Data

Mar. 29, 2017 (JP) ................................. 2017-066457

(51) Int. Cl.
G08B 5/36 (2006.01)
G08B 21/18 (2006.01)
G01D 5/353 (2006.01)
G01V 8/10 (2006.01)

(52) U.S. Cl.
CPC ........... *G08B 5/36* (2013.01); *G01D 5/35345* (2013.01); *G01D 5/35383* (2013.01); *G01V 8/10* (2013.01); *G08B 21/182* (2013.01)

(58) Field of Classification Search
CPC .... G08B 5/36; G08B 21/182; G01D 5/35345; G01D 5/35383; G01V 8/10
USPC .......................................... 340/600, 628–630
See application file for complete search history.

(56) References Cited

U.S. PATENT DOCUMENTS

| 9,841,808 B2 | 12/2017 | Hanada | |
| 2003/0136895 A1* | 7/2003 | Ogawa | G01J 1/32 250/205 |
| 2018/0180540 A1* | 6/2018 | Iguchi | G01N 21/53 |

FOREIGN PATENT DOCUMENTS

| JP | 1-77234 | 5/1989 |
| JP | 5-23178 | 3/1993 |
| JP | 6-85644 | 3/1994 |
| JP | 2002-71553 | 3/2002 |
| JP | 2006-351380 | 12/2006 |

OTHER PUBLICATIONS

U.S. Appl. No. 15/928,518, filed Mar. 22, 2018, Kazuhiro Makino et al., Keyence Corporation.

* cited by examiner

*Primary Examiner* — Joseph H Feild
*Assistant Examiner* — Sharmin Akhter

(57) ABSTRACT

A photoelectric sensor includes a connecting section for light projection to which a light propagation member for light projection optically coupled to a light emitting element is connected, a connecting section for light reception to which a light propagation member for light reception optically coupled to the light receiving element is connected, a signal generating unit configured to compare a light reception signal generated by the light receiving element and a threshold and generate a detection signal indicating a result of the comparison, a first light emitting element for indication optically coupled to the connecting section for light reception, and a mounting substrate on which each of the first light emitting element for indication and the light receiving element is positioned in the connecting section for light reception or one of the first light emitting element for indication and the light receiving element is positioned via the other.

20 Claims, 11 Drawing Sheets

PHOTOELECTRIC SENSOR

CROSS-REFERENCE TO RELATED APPLICATIONS

The present application claims foreign priority based on Japanese Patent Application No. 2017-066457, filed Mar. 29, 2017, the contents of which is incorporated herein by reference.

BACKGROUND OF THE INVENTION

1. Field of the Invention

The present invention relates to a photoelectric sensor and, more particularly, to a photoelectric sensor of a separation type including a light projecting and receiving unit optically coupled to a controller through a light propagation member such as an optical fiber.

2. Description of the Related Art

JP-UM-A-1-77234 (Patent Literature 1) discloses a photoelectric sensor of a reflection type that can be confirmed an operating state with a distal end portion of a light propagation member, that is, an optical fiber. The photoelectric sensor is a photoelectric sensor of a separation type including a light projecting element for detection (an LED) optically coupled to an end of an optical fiber for light projection and a light receiving element (a photodiode) optically coupled to an end of an optical fiber for light reception. A plurality of optical fibers for operation display are disposed around the optical fiber for light projection. The photoelectric sensor further includes a first LED for operation display optically coupled to ends of the plurality of optical fibers for operation display. Similarly, the photoelectric sensor further includes, around the optical fiber for light reception, a second LED for operation display optically coupled to ends of the plurality of optical fibers for operation display.

During normal operation, detection light from the light projecting element (the LED) is projected by the optical fiber for light projection. When the light is reflected by an object, the reflected light is detected by the light receiving element through the optical fiber for light reception.

When the light reception is stable, that is, in a state in which the object is stably detected by a comparator circuit having a threshold level higher than a threshold level, the first and second LEDs for operation display are lit in, for example, green. This state can be confirmed by the distal ends of the optical fibers. When the object is detected, the detection can be confirmed by the distal ends of the optical fibers.

JP-A-6-85644 (Patent Literature 2) proposes a photoelectric sensor having a purpose of simplifying positioning of an optical system, that is, relative positioning of an optical fiber for light projection and an optical fiber for light reception, that is, optical axis alignment in setting of the photoelectric sensor in a production line based on the premise that a main body, that is, a controller of a separation-type photoelectric sensor includes an operation display lamp and a stable operation display lamp.

The relative positioning of the optical fibers for light projection and reception is performed while confirming the operation display lamp and the stable operation display lamp of the controller. Therefore, when relative positioning work of the optical fibers for light projection and reception, that is, work of the optical axis alignment is performed in a place away from the controller, the relative positioning of the optical fibers for light projection and reception is substantially difficult. In order to solve this problem, it is proposed to dispose an LED for display side by side with an LED for light projection in the controller. This makes it possible to induce, using an optical fiber optically coupled to the LED for light projection, light of the LED for display to the distal end of the optical fiber.

JP-A-2002-71553 (Patent Literature 3) discloses a separation-type photoelectric sensor including a single detection head and a controller, which are coupled by an optical fiber. The photoelectric sensor is applied to detection of a liquid spill (liquid leakage) around a tank that stores volatile liquid. The detection head has a detection surface and projects light toward the detection surface. When the detection surface is wet by a liquid spill, the light is transmitted through the detection surface and cannot be received. Therefore, a light reception amount decreases. Consequently, the liquid spill can be detected. The photoelectric sensor includes a light dividing unit that divides a part of the light upward halfway in inducing the light toward the detection surface in the detection head and includes a display unit that makes it possible to visually recognize the divided light from above the detection head.

The controller includes a red light source and a yellow light source as light projection elements. The red light source and the yellow light source are disposed to be orthogonal to each other. A half mirror is interposed between the red light source and the yellow light source. For example, the red light source is used during normal operation. When a liquid spill is detected, the red light source is switched to the yellow light source. Consequently, a red color can be visually recognized through the display unit at normal time and a yellow color can be visually recognized through the display unit during the liquid spill.

As a modification, the red and yellow light sources may be lit together at the normal time such that an orange color is visually recognized through the display unit. Further, as a modification, it is proposed to, when an abnormality such as an attachment failure of the sensor, a failure of an electric circuit, deterioration of the light receiving element, or breakage of the optical fiber is detected, change a light emission form of the light projecting element.

SUMMARY OF THE INVENTION

An object of the present invention is to provide, on the basis of a photoelectric sensor of a separation type including a light projecting unit and a light receiving unit coupled to a controller through a light propagation member, a photoelectric sensor that includes a display light emission source incorporated in the controller and can cause the light receiving unit to emit light with a sufficient amount of light without causing an increase in the size of the photoelectric sensor including a mechanism for causing the light emitting unit to emit light with the display light emission source and without deteriorating light reception performance.

According to the present invention, the technical subject is achieved by providing a photoelectric sensor including:

a light emitting element configured to project detection light toward a detection region;

a light receiving element configured to receive the detection light reflected from the detection region;

a connecting section for light projection to which a light propagation member for light projection optically coupled to the light emitting element is connected;

a connecting section for light reception to which a light propagation member for light reception optically coupled to the light receiving element is connected;

a signal generating unit configured to compare a light reception signal generated by the light receiving element and a threshold and generate a detection signal indicating a result of the comparison;

a first light emitting element for indication which is optically coupled to the connecting section for light reception and projects an indication light in response to the light reception signal; and a mounting substrate which the first light emitting element for indication and the light receiving element are mounted on or above, and each of the first light emitting element for indication and the light receiving element provided on the mounting substrate being positioned to the connecting section for light reception or one of the first light emitting element for indication and the light receiving element being positioned to the connecting section for light reception via the other.

In an embodiment, the connecting section for light projection is typically configured by a first insertion hole 376 in an element holder 368. In the embodiment, the connecting section for light reception is typically configured by a second insertion hole 378 in the element holder 368. Both of the light propagation member for light projection and the light propagation member for light reception are typically configured by optical fibers. According to the present invention, by preparing the mounting substrate and disposing the light receiving element and the first light emitting element for display on the mounting substrate in a state in which the optical coupling to the light propagation member for light reception (the optical fiber for light reception) can be maintained, it is possible to position the light receiving element and the first light emitting element for display in a state in which the light receiving element and the first light emitting element for display are close to the optical fiber for light reception). Consequently, it is possible to effectively supply light emitted by the first light emitting element for display to the optical fiber for light reception while maintaining light reception performance of the light receiving element.

A preferred embodiment of the present invention is explained in detail below. Action and effects and other objects of the present invention will become apparent through the detailed explanation.

DESCRIPTION OF EMBODIMENTS

Figure 16:
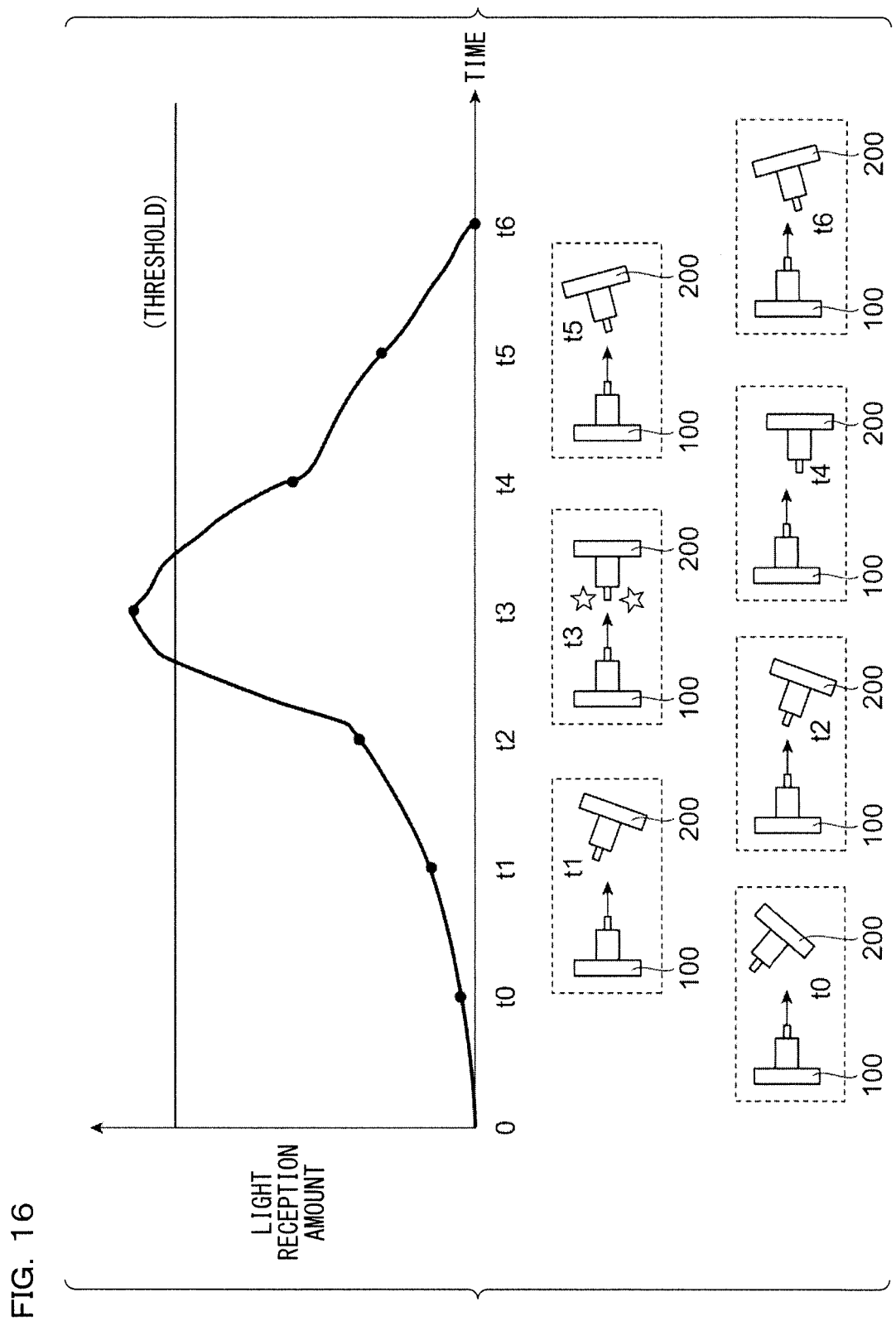
FIG. 16 is a diagram for explaining optical axis adjustment of the light projecting head and the light receiving head.

FIG. 16 is a diagram for explaining relative positioning between a light projection unit and a light receiving unit in a separation-type photoelectric sensor, that is, optical axis alignment of a light projecting head 100 and a light receiving head 200. In FIG. 16, t0 to t6 indicate elapse of time. Relative positioning of the light projecting head 100 and the light receiving head 200 is performed while moving the heads. In an example shown in FIG. 16, when the time is t3, the optical axis alignment is successfully performed. A light reception amount is the maximum.

A range of X % (e.g., 10%) from the maximum of the light reception amount is set as a light reception amount at which optical axes are aligned. A light reception amount lower than the maximum of the light reception amount by X % is set as a threshold. In a region where a light reception amount is larger than the threshold, the light reception amount is the light reception amount at the time when the optical axes are aligned. When the optical axes are adjusted next time, that is, the relative positioning of the light projecting head 100 and the light receiving head 200 is performed next time, the optical axis adjustment is performed using the threshold.

As clearly described in Patent Literature 2, when the light projecting head 100, the light receiving head 200, and the controller are separated, display of the controller cannot be confirmed. Therefore, the optical axis adjustment of the light projecting head 100 and the light receiving head 200 is difficult.

Referring back to FIG. 16, when the optical axes are aligned, for example, the time is t3, and the light receiving head 200 emits light, it is possible to learn that the optical axes are aligned by viewing the light. A state of the light emission of the light receiving head 200 is indicated by a star mark in FIG. 16. That is, in the optical axis adjustment, the display of the controller does not have to be confirmed every time. In other words, besides the controller, the light receiving head 200 is caused to emit light. Therefore, the light receiving head 200 includes substantial display means. The same applies to the light projecting head 100. For example, when both of the light projecting head 100 and the light receiving head 200 emit lights, a pair of the light projecting head 100 and the light receiving head 200 can be visually recognized. This is very effective when a plurality of pairs of the light projecting heads 100 and the light receiving heads 200 are set side by side.

In order to realize this, in the photoelectric sensor disclosed in Patent Literature 1, the plurality of optical fibers for operation display are disposed around the optical fiber for light projection optically coupled to the end of the light projecting element (the LED). The photoelectric sensor further includes the first LED for operation display optically coupled to the ends of the plurality of optical fibers for operation display. Similarly, the photoelectric sensor further includes, around the optical fiber for light reception optically coupled to the end of the light receiving element (the photodiode), the second LED for operation display optically coupled to the ends of the plurality of optical fibers for operation display.

Patent Literature 2 proposes to dispose the LED for display side by side with the LED for light projection in the controller to induce, using the optical fiber optically coupled to the LED for light projection, light of the LED for display to the distal end of the optical fiber.

Embodiment

As a preferred embodiment of the present invention, a photoelectric sensor of a transmission type is explained below with reference to the accompanying drawings. However, the present invention is not limited to the photoelectric sensor of the transmission type and can be suitably applied to a photoelectric sensor of a reflection type as well.

FIGS. 1 to 5 are figures concerning a separation-type photoelectric sensor in this embodiment and, more in detail, concerning the photoelectric sensor of the transmission type. A transmission-type photoelectric sensor 1 shown in the figures is a photoelectric sensor of a separation type including a controller 300 (FIG. 3) to which a light projecting head 100 and a light receiving head 200 (FIG. 5) are connected. In the transmission-type photoelectric sensor 1, the light projecting head 100, the light receiving head 200, and the controller 300 are physically separated. The light projecting head 100 and the light receiving head 200 are connected to the controller 300 via an optical fiber Fb (FIG. 3), which is a light propagation member.

Figure 1:
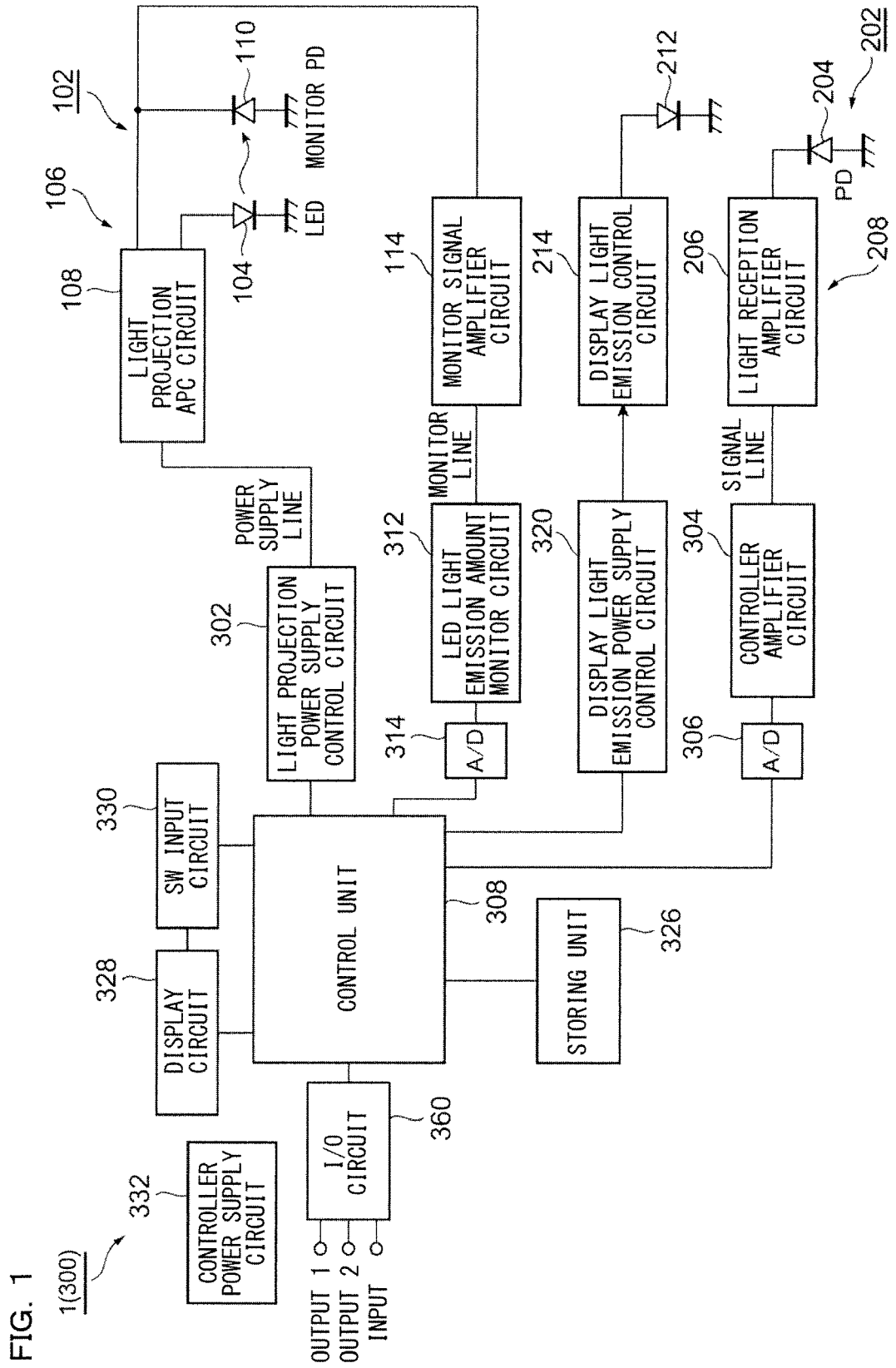
FIG. 1 is a functional block diagram of a photoelectric sensor in an embodiment.

FIG. 1 is a block diagram of the controller 300. A basic configuration of the controller 300 is explained with reference to FIG. 2.

Basic Configuration of the Photoelectric Sensor 1

The photoelectric sensor 1 includes the controller 300 (FIG. 3), the light projecting head 100 (FIG. 5) connected to the controller 300 by the optical fiber Fb, which is a typical light propagation member, and the light receiving head 200 (FIG. 5) connected to the controller 300 by the optical fiber Fb, which is the typical light propagation member.

Referring to FIG. 1, the controller 300 includes a light projecting unit 102 and a light receiving unit 202. The light projecting unit 102 outputs predetermined pulse light to the light projecting head 100. A light emitting element 104 of the light projecting unit 102 is driven by an oscillation pulse supplied from a light projection power supply control circuit 302 to emit pulse light. The light received by the light receiving unit 202 is photoelectrically converted by a light receiving element 204 and sent to a control unit 308 though a light receiving element amplifier circuit 206 and an amplifier circuit 304 and an A/D converter 306 of the controller 300. Consequently, detection synchronizing with the pulse light is applied. A detection signal is further converted into a direct-current signal or the like and thereafter output from an I/O circuit 360, which configures an interface unit, as an ON/OFF signal representing a detection result.

The controller 300 includes the light emitting element 104 for light projection as the light projecting unit 102 and includes a light projection circuit 106 for driving the light emitting element 104. A typical example of the light emitting element 104 is an LED. The light projection circuit 106 includes a light projection APC circuit 108 and a light receiving element for monitor 110 such as a monitor PD. The light projection APC circuit 108 controls an output, that is, a light emission amount of the light emitting element 104 to be a predetermined value.

The light receiving element for monitor 110 of the light projecting unit 102 is connected to a monitor signal amplifier circuit 114. The light receiving element for monitor 110 sends a light reception amount to an LED light emission amount monitor circuit 312 via a monitor line. The LED light emission amount monitor circuit 312 supplies a light reception amount signal converted into a digital signal via an A/D converter 314 to the control unit 308. The control unit 308 controls the light projection light source control circuit 302 on the basis of a light emission amount detected by the light receiving element for monitor 110 to set the light emission amount to a predetermined value and performs feedback control for adjusting a current amount of the light projection APC circuit 108 and driving the light emitting element 104.

The controller 300 includes a light reception circuit 208 for driving the light receiving element 204. The light receiving element 204 is connected to the light receiving element amplifier circuit 206. As explained above, a light reception amount of light received by the light receiving element 204 is amplified by the light receiving element amplifier circuit 206 and sent to the amplifier circuit 304. An analog signal amplified by the controller amplifier circuit 304 is converted into digital signal via the A/D converter 306 and input to the control unit 308. Consequently, the controller 300 detects the light reception amount of the light receiving element (a photodiode PD) 204, performs determination of the detection on the basis of a predetermined threshold, generates a detection signal indicating a result of the detection, and finally outputs the determination result from the I/O circuit 360.

A storing unit 326 for storing various setting values and the like, a display circuit 328 for displaying information on the controller 300 side, a switch input circuit 330 to which an operation unit 362 (FIG. 2), which is a user interface for receiving setting value adjustment, is connected, the I/O circuit 360 that performs input and output to and from the outside, and the like are connected to the control unit 308. These circuits are driven by a controller power supply circuit 332.

Note that the control unit 308 is configured from an IC such as a CPU, an FPGA, or an ASIC. Various circuits (108, 114, 206, 214, 302, 304, 306, 312, 314, 320, 328, 330, 332, and 360) may be respectively configured from ICs. The various circuits may be configured by one IC. The control unit 308 and the various circuits may be configured by one IC.

Figure 2:
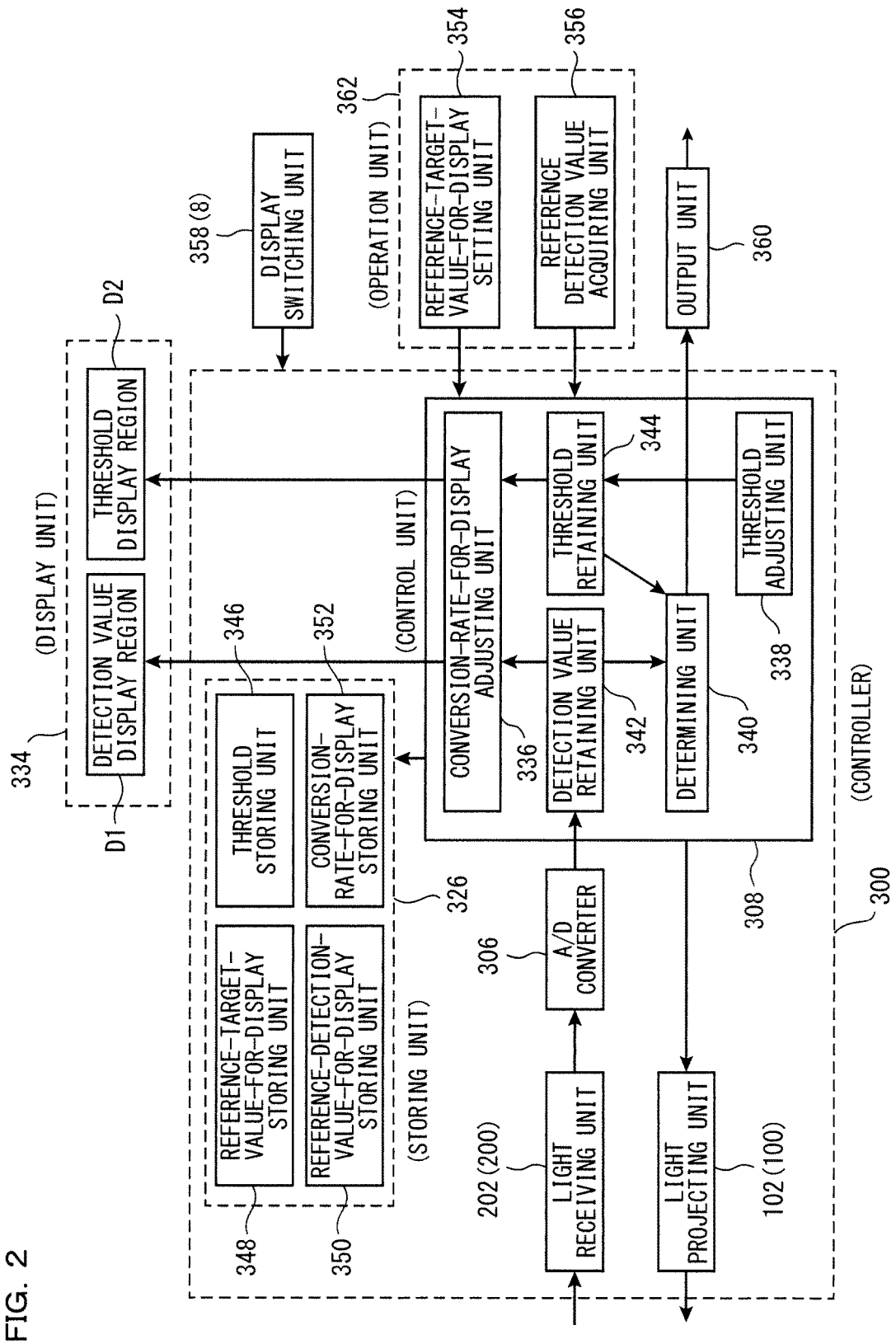
FIG. 2 is a block diagram of a configuration for realizing an adjusting function of a photoelectric switch.

A configuration for realizing an adjusting function of the photoelectric sensor 1 is explained with reference to a block diagram of FIG. 2. The controller 300 includes the control unit 308 for performing the various kinds of control, the storing unit 326 for storing setting values and the like, a display unit 334 for displaying a threshold, a detection value, a target value, and the like, the operation unit 362 for performing various kinds of operation and setting, a display switching unit 358 for switching a display mode in the display unit 334, an output unit 360 for outputting a detection result, and the A/D converter 306 for converting an analog signal of a light reception amount of light received by the light receiving unit 202 into a digital signal. The control unit 308 includes a conversion-rate-for-display adjusting unit 336, a threshold adjusting unit 338, a determining unit 340, a detection value retaining unit 342 that retains a detection value, and a threshold retaining unit 334 that retains a threshold. Further, the storing unit 326 includes a threshold storing unit 346, a reference-target-value-for-display storing unit 348, a reference-detection-value-for-display storing unit 350, and a conversion-rate-for-display storing unit 352. The control unit 308 is configured by a microprocessor such as a CPU. The operation unit 362 of the controller 300 includes a reference-target-value-for-display setting unit 354 and a reference detection value acquiring unit 356.

Figure 5:
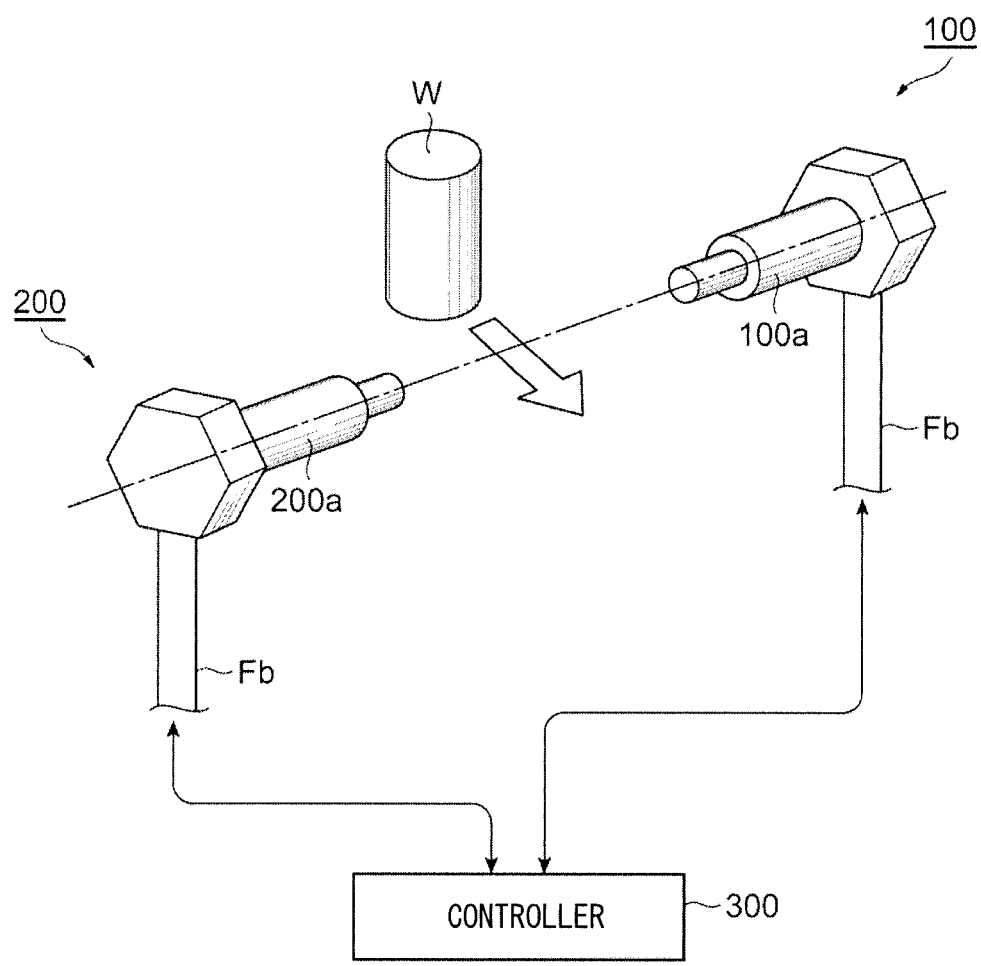
FIG. 5 is a diagram for explaining generation of a detection region between a light projecting head and a light receiving head.

Referring to FIGS. 1 and 5, the photoelectric sensor 1 supplies detection light emitted by the light projecting unit 102 to the light projecting head 100 via the optical fiber Fb. The light projecting head 100 emits light toward a detection region. The photoelectric sensor 1 receives, via the light receiving head 200, light reflected from the detection region. The light is supplied to the light receiving unit 202 via the optical fiber Fb. The determining unit 340 (FIG. 2) compares, as a detection value, a light reception amount of the light received by the light receiving unit 202 with a threshold and outputs a result of the comparison from the output unit 360. Specifically, the determining unit 340 (FIG. 2) compares a digital value of the input detection value with the threshold and outputs a result of the comparison to an external device from the output unit 360 as a binary signal indicating presence or absence of a detection target object.

Figure 3:
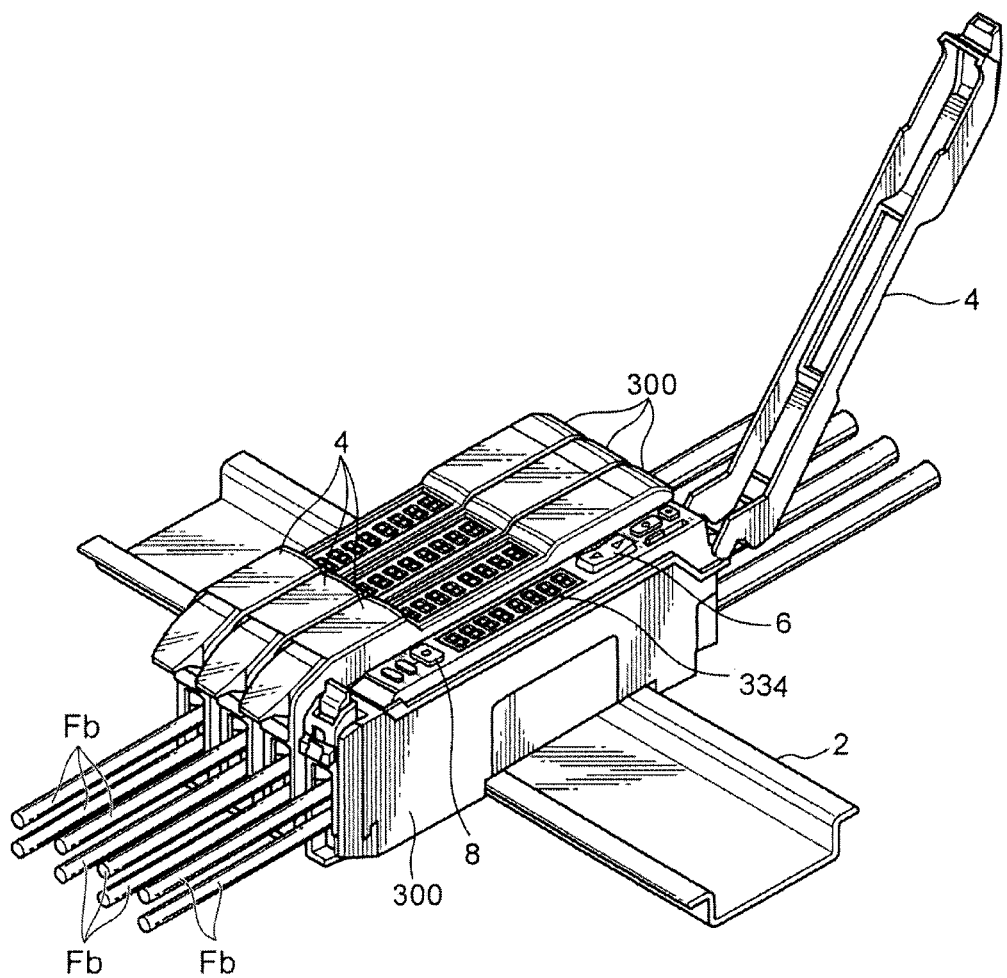
FIG. 3 is a perspective view showing a state in which a plurality of controllers of a photoelectric switch of a separation type are arrayed in lateral arrangement.

FIG. 3 is a perspective view of the controller 300 viewed from obliquely above. In FIG. 3, an example is shown in which four controllers 300 are set adjacent to one another on a DIN rail 2. One controller 300 among the four controllers 300 is shown in a state in which an upper lid 4 is opened.

Among the plurality of controllers 300 set adjacent to one another on the DIN rail 2, one is a master set and the others are slave sets. For example, when light projection of the master set ends, the master set supplies a signal of a light projection start to a first slave set. The first slave set executes light projection. When the light of the first slave set ends, the first slave set supplies a signal of a projection start to a second slave set. The second slave set executes light projection. Thereafter, third and fourth slave sets sequentially start light projection.

Figure 4:
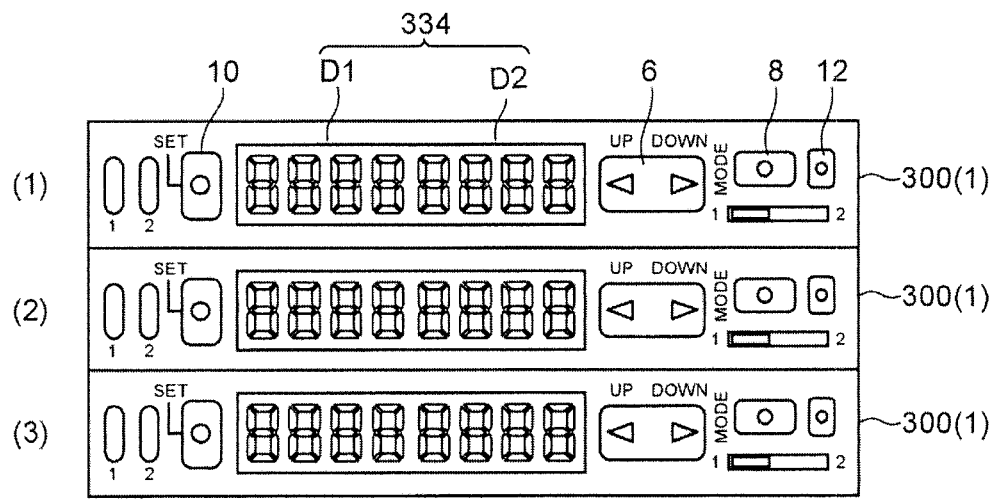
FIG. 4 is a plan view of the plurality of controllers disposed side by side of the separation-type photoelectric switch shown in FIG. 3.

FIG. 4 is a plan view of the photoelectric sensor 1. Referring to FIGS. 3 and 4, the display unit 334 is configured by two four-digit seven-segment displays D1 and D2 disposed side by side. A detection value (a light reception amount), a threshold, and the like are displayed using the two four-digit seven-segment displays D1 and D2. The display unit 334 may be configured by a flat display such as a liquid crystal display.

An up-down button 6 of a swing type, a mode button 8, a set button 10, a preset button 12, and the like are disposed adjacent to the displays D1 and D2.

Referring back to FIG. 2, the controller 300 includes the display switching unit 358. The display switching unit 358 is configured by the mode button (M button) 8 and the preset button 12. By operating the mode button 8 and the preset button 12, it is possible to switch a non-conversion display mode for directly displaying the detection value (the light reception amount) and the threshold and a conversion display mode for displaying a detection value for display (a light reception amount for display) and a threshold for display converted at a conversion rate for display or by a conversion formula for display.

The threshold can be adjusted by operating the set button 10 and the up-down button 6. The up-down button 6 is used for a change of the threshold and other numerical values, determination of a choice, and the like. A display target, a display form, display switching operation, and display mode switching of the controller 300 are described in detail in the specification of JP-A-2006-351380. Therefore, the specification of JP-A-2006-351380 is incorporated herein by reference to omit explanation of the display target, the display form, the display switching operation, and the display mode switching of the controller 300.

The transmission-type photoelectric sensor 1 is explained above. However, the structure of a photoelectric sensor of a reflection type is substantially the same. The present invention is not limited to the transmission type and is applicable to the photoelectric sensor of the reflection type as well. As explained above, the present invention is suitably applied to the photoelectric sensor of the fiber type in which the light projecting head 100 the light receiving head 200 and the controller 300 are connected by the optical fiber Fb, which is the light propagation member.

Referring to FIG. 5, the light receiving head 200 includes a light receiving cylinder 200a that receives light projected from the light projecting head 100. The light projecting head 100 includes a light projecting cylinder 100a that emits detection light. The light projecting head 100 projects the detection light toward the detection region. The light receiving head 200 receives light reflected from the detection region. In setting of the light projecting head 100 and the light receiving head 200, relative positioning of the light projecting head 100 and the light receiving head 200 affects the performance of the photoelectric sensor 1. The positioning is performed by causing the light projecting cylinder 100a and the light receiving cylinder 200a of the light receiving head 200 to face each other and aligning the axis of the light projecting cylinder 100a and the axis of the light receiving cylinder 200a. By properly setting the light projecting head 200 and the light receiving head 200, it is possible to properly detect "presence" and "absence" of work W according to presence or absence of light blocking involved in passage of the work W between the light receiving head 200 and the light projecting head 100.

Display Light Emitting Mechanism

Referring to FIG. 1, the light receiving unit 202 includes a light emitting element for indication 212 functioning as a light emission source. The light emitting element for indication 212 is typically configured by an LED. For example, when the light emitting element 104 is configured by a red LED, the light emitting element for indication 212 is desirably configured by an LED of a color different from red, for example, a green LED. Lighting of the light emitting element for indication 212 is controlled by the display light emission control circuit 214. Driving electric power is supplied to the display light emission control circuit 214 by a display light emission power supply control circuit 320.

Light received by the light receiving unit 202 is amplified via the light receiving element (PD) 204, the light reception amplifier circuit 206, and the controller amplifier circuit 304 and A/D-converted by the A/D converter 306. As explained with reference to FIG. 16, the control unit 308 controls the light emitting element for indication 212 on the basis of a light reception amount based on a signal of the light. The control unit 308 can control the light emitting element for indication 212 according to (a) a color of display light (visible light), (b) the number of times of flashing, (c) a flashing cycle, (d) a cycle of intensity of display, (e) a switching cycle of a plurality of display colors, and the like on the basis of the light reception amount.

Hardware Configuration of the Controller 300 (FIGS. 6 to 9)

Figure 6:
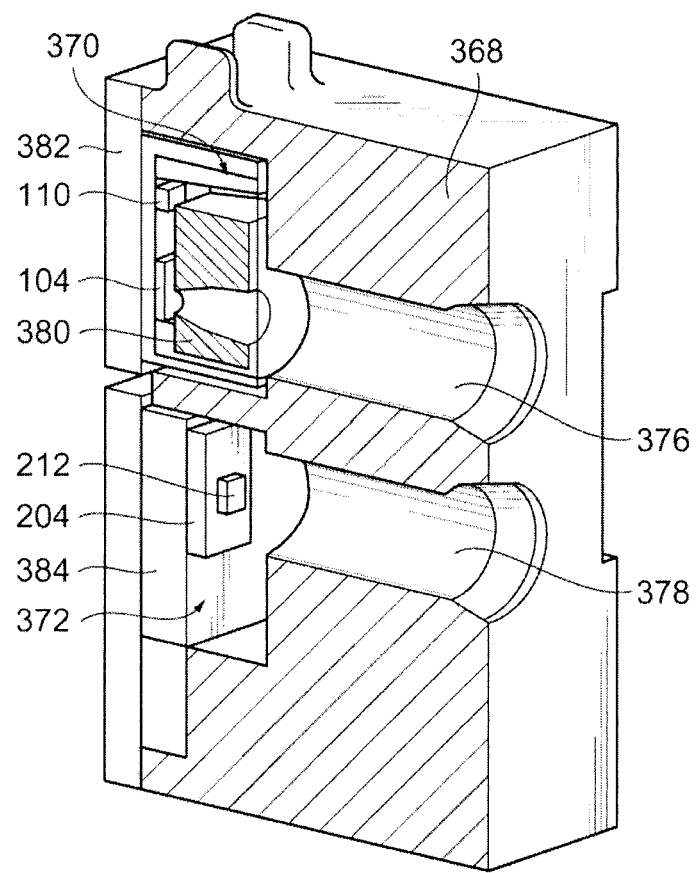
FIG. 6 is a longitudinal sectional perspective view of a controller for explaining a light projecting unit, a light receiving unit, and a structure related to the light projecting unit and the light receiving unit.

Referring to FIG. 6, the controller 300 includes an element holder 368. A light projecting member 370 and a light receiving member 372 are housed in the element holder 368. The light projecting member 370 substantially configures the light projecting unit 102. The light receiving member 372 substantially configures the light receiving unit 202. The element holder 368 includes a first insertion hole 376 that receives the optical fiber Fb, which is the light propagation member, between the controller 300 and the light projecting head 100 and a second insertion hole 378 that receives the optical fiber Fb, which is the light propagation member, between the controller 300 and the light receiving head 200. The first insertion hole 376 configures a connecting section for light projection that connects an optical fiber for light projection. The second insertion hole 378 configures a connecting section for light reception that connects an optical fiber for light reception. The distal end portions of the optical fibers Fb are deeply fit in the first and second insertion holes 376 and 378.

Figure 7:
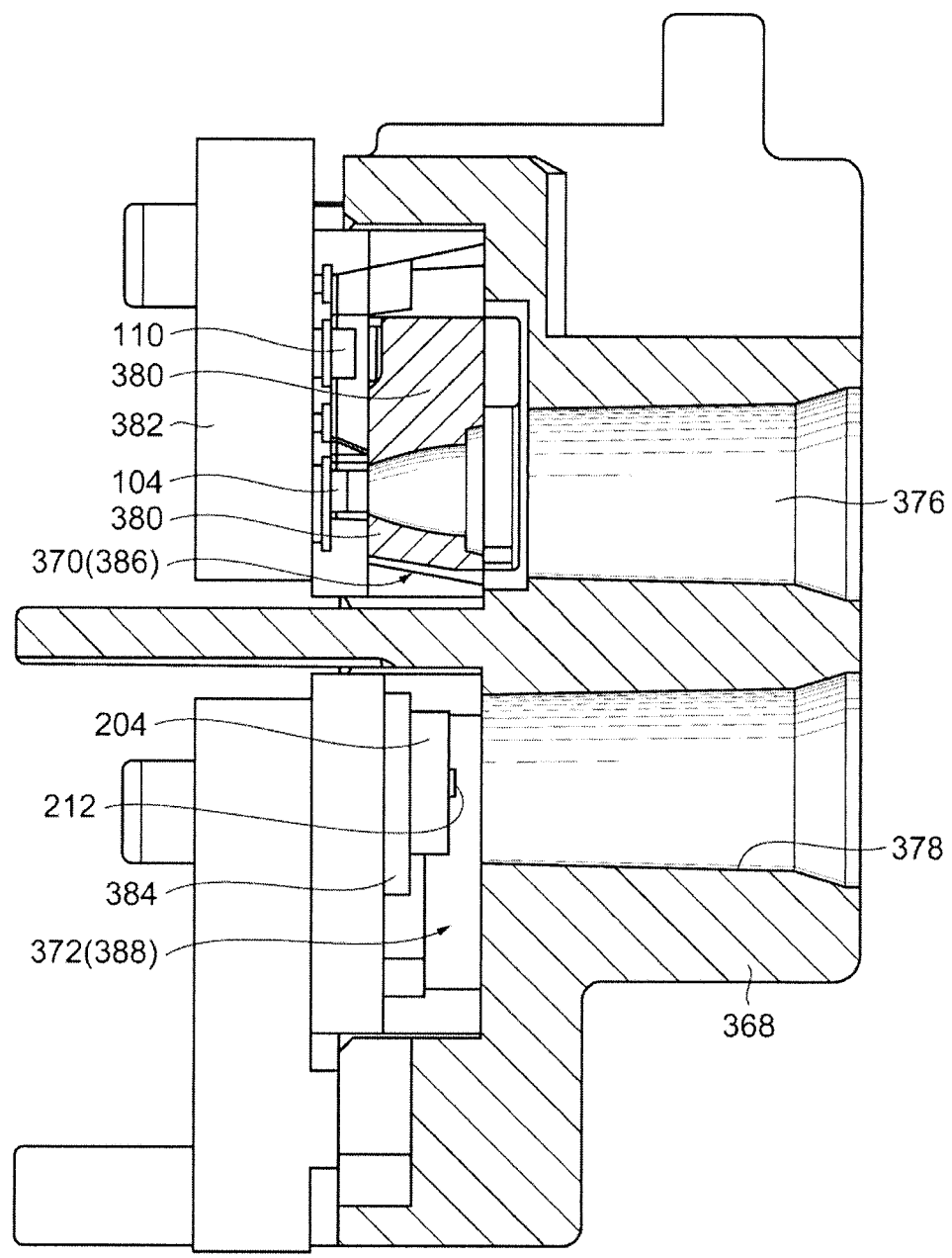
FIG. 7 is a longitudinal sectional view of the controller for explaining the light projecting unit, the light receiving unit, and the structure related to the light projecting unit and the light receiving unit.

Referring to FIG. 6 and FIG. 7, which is a longitudinal sectional view of the controller 300, the light projecting member 370 includes an LED as the light emitting element 104 and includes the light receiving element for monitor 110 such as the monitor PD and a reflector 380. The light receiving element for monitor 110 detects a light emission amount of the light emitting element 104. Feedback control of the light emitting element 104 is performed to set the detected light emission amount to a predetermined value.

The light receiving member 372 includes the light receiving element 204 configured by the photodiode PD and the LED 212 functioning as the light emitting element for indication. The display light emitting LED 212 is disposed on the light receiving element 204. That is, the light receiving element 204 includes a main light receiving surface of the light receiving element 204, that is, a light receiving surface facing the second insertion hole 378 (the optical fiber for light reception Fb). The display light emitting LED 212 is disposed on the main light receiving surface of the light receiving element 204. In FIG. 7, reference sign 382 denotes a mounting substrate for light projection and reference sign 384 denotes a mounting substrate for light reception.

Figure 8:
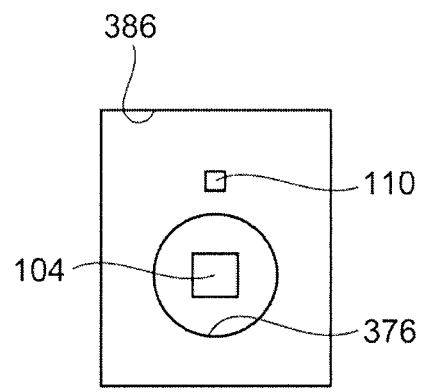
FIG. 8 is a diagram for explaining a relation between a hole that receives an optical fiber on a light projection side and a light projection side space.
Figure 9:
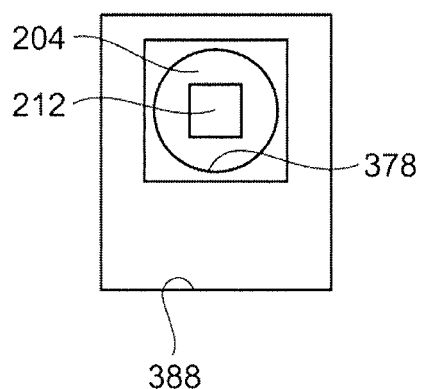
FIG. 9 is a diagram for explaining a relation between a hole that receives an optical fiber on a light reception side and a light reception side space.

Reference numeral 386 in FIG. 7 denotes a light projection side space in which the light projecting member 370 (FIG. 6) is set. Reference numeral 388 denotes a light reception side space in which the light receiving member 372 (FIG. 6) is set. The light projection side space 386 and the light reception side space 388 are optically isolated. Referring to FIG. 8 for explaining relative positions of the light projection side space 386 and the first insertion hole 376 (a hole that receives the optical fiber Fb on the light projection side), the light emitting element 104 is positioned such that the center of the light emitting element 104 coincides with the axis of the first insertion hole 376. Referring to FIG. 9 for explaining relative positions of the light reception side space 388 and the second insertion hole 378 (a hole that receives the optical fiber Fb on the reception side), the light receiving element 204 is positioned such that the center of the light receiving element 204 coincides with the axis of the second insertion hole 378.

Figure 10:
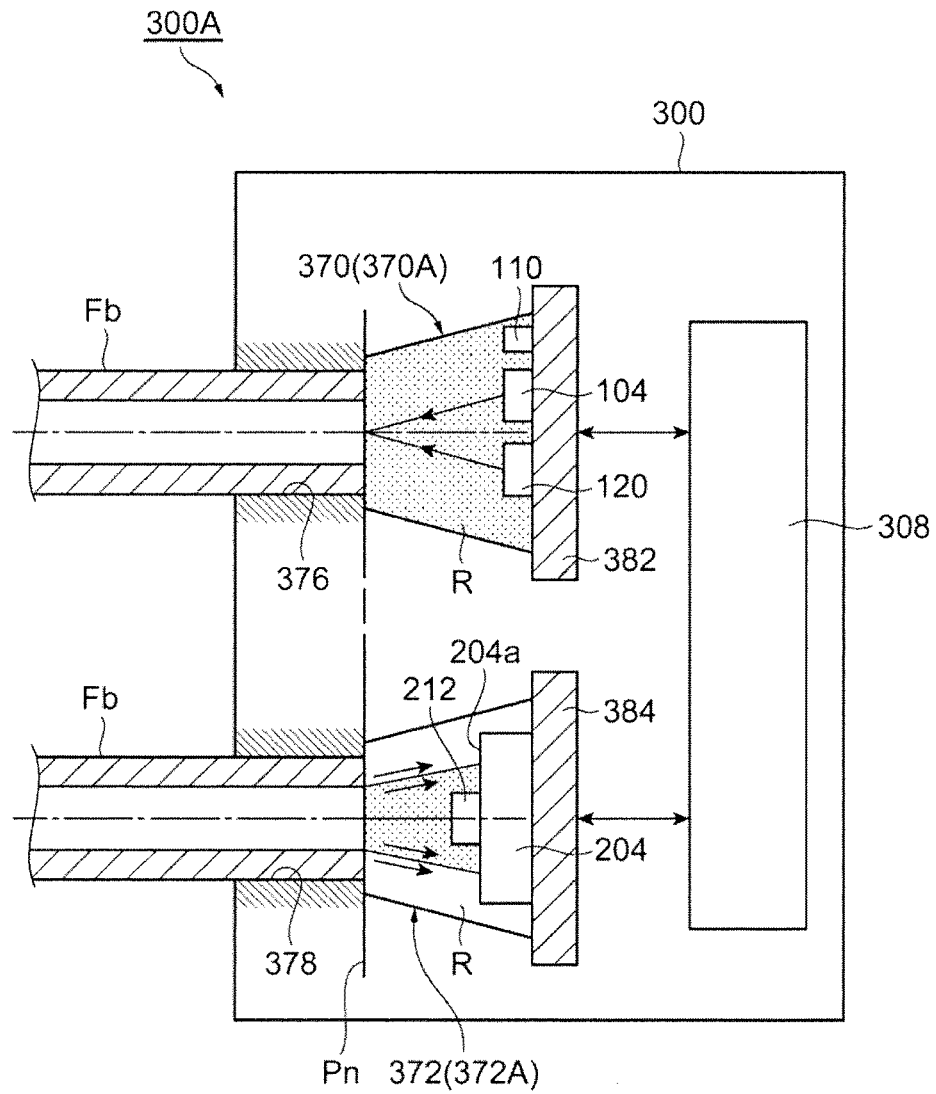
FIG. 10 is a diagram for explaining the structure of a light receiving member and a light projecting member included in the controller.

FIG. 10 is a diagram for explaining a light receiving member 372A and a light projecting member 370A included in the controller 300. The light projecting member 370A shown in FIG. 10 includes the light receiving element for monitor 110 (FIG. 6). The light receiving member 372A includes the light receiving element 204 configured by a photodiode bare chip and includes, as a light emission source, the light emitting element for indication 212 configured by an LED bare chip. The light receiving element 204 and the light emitting element for indication 212 are mounted on the mounting substrate for light reception 384. That is, the mounting substrate for light reception 384 is positioned, whereby the photodiode bare chip configuring the light receiving element 204 is positioned in a state in which the photodiode bare chip is centered on the axis of the insertion end of the optical fiber Fb for light reception (the axis of the second insertion hole 378). The light receiving element 204 is mounted on the mounting substrate for light reception 384. The light receiving surface 204a is positioned in a state in which the light receiving surface 204a faces the optical fiber for light reception Fb. The light emitting element for indication 212 is mounted on the light receiving surface 204a directed to the optical fiber Fb for light reception. Further, the light emitting element for indication 212 and the light receiving element 204 are surrounded by common transparent mold resin R having a trapezoidal shape in section. The insertion end of the optical fiber Fb for light reception is fixed to the second insertion hole 378 in a state in which the insertion end is in contact with the mold resin R.

That is, the photodiode bare chip (the light receiving element 204) is disposed on the mounting substrate for light reception 384. The LED bare chip (the light emitting element for indication 212) is disposed on the insertion end side of the optical fiber Fb for light reception. The photodiode bare chip and the LED bare chip are surrounded by the common transparent mold resin R. The mold resin R is desirably surrounded by a material that reflects light or a material that can electrically shield the mold resin R. For example, metal is vapor-deposited on the outer surface of the mold resin R.

As it is seen from FIG. 10, the main light receiving surface 204a of the photodiode bare chip of the light receiving element 204 is larger than the LED bare chip of the light emitting element for indication 212.

The light emitting element for indication 212 mounted on the light receiving element 204 is positioned in a state in which the light emitting element for indication 212 is separated from the insertion end of the optical fiber Fb for light reception by the transparent mold resin R. In FIG. 10, arrows indicate detection light entering the light receiving member 372A from the optical fiber Fb for light reception. The detection light enters the light receiving member 372A in a state of a spread fan from the insertion end of the optical fiber Fb for light reception. A light receiving area is indicated by dots. The detection light is received in a portion excluding a portion occupied by the light emitting element for indication 212 on the main light receiving surface 204a of the light receiving element 204. That is, the area occupied by the light emitting element for indication 212 is considerably small compared with the area of the main light receiving surface 204a of the light receiving element 204. The light emitting element for display 212 is positioned in the center portion of the main light receiving surface 204a. The light receiving element 204 can receive light in the outer circumferential portion of the center portion. Note that the insertion end of the optical fiber Fb for light projection and the insertion end of the optical fiber Fb for light reception are designed to be located on a common plane Pn (FIG. 10).

The light emitting element for indication 212 in a mounted state on the light receiving element 204 is positioned in a state in which the light emitting element for indication 212 is close to the insertion end of the optical fiber Fb. Therefore, even if a light amount of the light emitting element for indication 212 is relatively small, since an amount of light entering the optical fiber Fb is large, it is possible to intensely emit light at the distal end of the optical fiber Fb, that is, in the light receiving head 200. In other words, if a degree of light emission in the light receiving head 200 is the same, an amount of light emitted by the light emitting element for indication 212 may be smaller as the light emitting element for indication 212 is set closer to the insertion end of the optical fiber Fb.

The controller 300 may include, as the light projecting member 370A, an optical light emitting element for indication 120 functioning as a light emission source in addition to the LED functioning as the light emitting element 104 and the light receiving element for monitor 110 such as the monitor PD. The light emitting element 104, the light receiving element for monitor 110, and the optical light emitting element for indication 120 are mounted on the mounting substrate for light projection 382 positioned in the controller 300. The display element for monitor 110 is incorporated in the common mounting substrate for light projection 382 together with the light emitting element 104 and the optical light emitting element for indication 120. As explained above, the light receiving element for monitor 110 detects a light emission amount of the light emitting element 104. The detected light emission amount is used to performing feedback control of the light emitting element 104 to set the light emission amount to a predetermined value.

As it is seen well from FIG. 10, the light receiving element for monitor 110 explained above with reference to FIG. 6 is disposed in a position away from the light receiving member 372. That is, the light receiving element for monitor 110 is disposed on the opposite side of the light receiving member 372.

The optical light emitting element for indication 120 is typically configured by an LED. The LED may be an LED having the same color as the LED of the light emitting element 104. However, the LED is desirably an LED having a different color. Specifically, if the LED of the light emitting element 104 is red, the LED of the optical light emitting element for indication 120 is desirably green.

A color of the optical light emitting element for indication 120 included in the light projecting member 370A may be the same as or may be different from a color of the light emitting element for indication 212 included in the light receiving member 372A. By adopting the different colors, it is easy to distinguish the light projecting head 100 and the light receiving head 200.

The LED of the light emitting element 104 is configured by a bare chip. The LED of the optical light emitting element for indication 120 is also configured by a bare chip. The LED bare chip configuring the light emitting element 104 and the LED bare chip configuring the optical light emitting element for indication 120 are positioned to be disposed side by side with respect to the insertion end of the optical fiber Fb for light projection. The light emitting element 104 and the optical light emitting element for indication 120 are assembled to the common substrate 382. The light emitting element 104 and the optical light emitting element for indication 120 are surrounded by the common transparent mold resin R having a trapezoidal shape in section. The insertion end of the optical fiber Fb for light projection is fixed to the first insertion hole 376 in a state in which the insertion end is in contact with the mold resin R.

Figure 11:
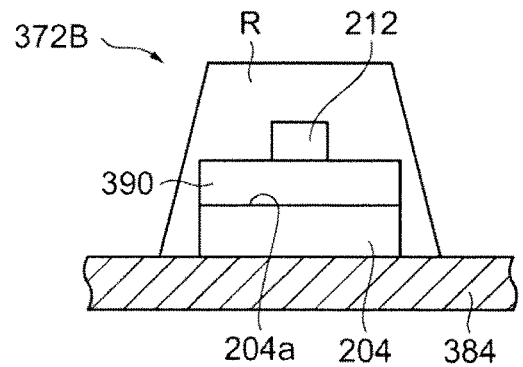
FIG. 11 is a diagram for explaining a modification of the light receiving member.
Figure 12:
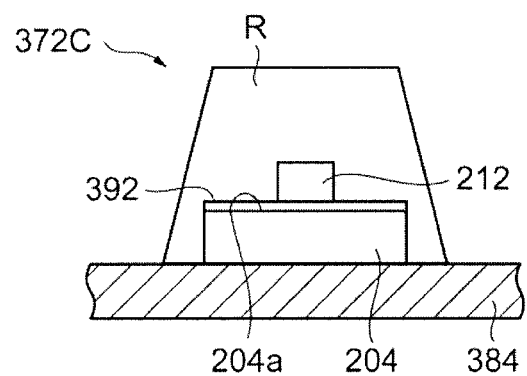
FIG. 12 is a diagram for explaining another modification of the light receiving member.

FIGS. 11 and 12 are diagrams for explaining modifications of the light receiving member 372. A light receiving member 372B in the modification shown in FIG. 11 has a three-layer structure. That is, the light receiving member 372 includes the light receiving element 204 configured by a photodiode bare chip. The light receiving element 204 is mounted on the mounting substrate for light reception 384. A filter member 390 having a wavelength-selective light absorbing ability is mounted between the light receiving element 204 and the light emitting element for indication 212 configured by the LED bare chip located above the light receiving element 204. The filter member 390 may have the same area as the main light receiving surface 204a of the light receiving element 204 or may have size limited to a part in contact with the light emitting element for indication 212 and the periphery of the part. The filter member 390 may have an area larger than the light receiving surface 204a. The filter member 390 has thickness compared with a coating film and is configured by color glass such as red glass or a color-coated transparent member. With the filter member 390, it is possible to reduce a degree of an adverse effect on the light receiving element 204 by visible light (display light) emitted by the light emitting element for indication 212.

A light receiving member 372C in the modification shown in FIG. 12 includes, instead of the filter member 390 having the thickness, a thin film 392 such as a film or a metal film having a light reflecting ability. The thin film 392 may be disposed in the entire region of the light receiving surface 204a of the light receiving element 204 or may be disposed limitedly to a part in contact with the light emitting element for indication 212 and the periphery of the part.

Figure 13:
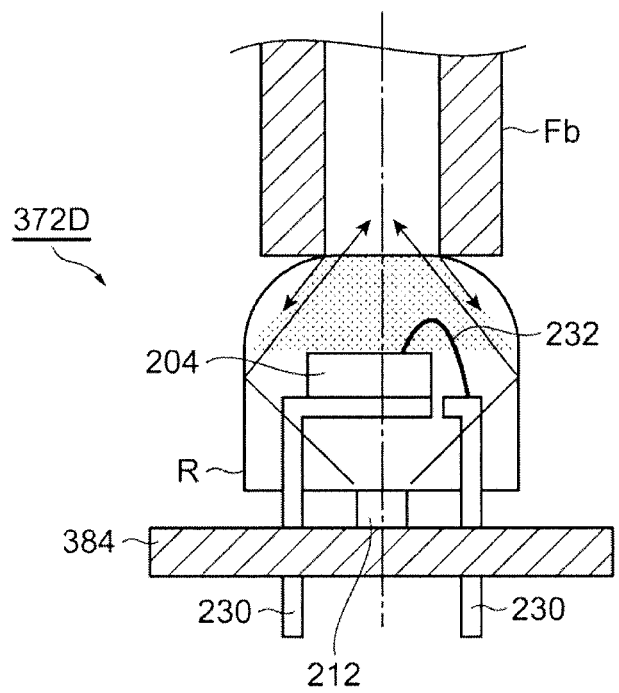
FIG. 13 is a diagram for explaining still another modification of the light receiving member.

A light receiving member 372D in the modification shown in FIG. 13 includes the light emitting element for indication 212 mounted on the mounting substrate for light reception 384 and formed by an LED chip and includes the light receiving element 204 positioned above the light emitting element for indication 212 by a lead frame 230. The light receiving element 204 is configured by a photodiode bare chip. In FIG. 13, reference numeral 232 denotes a wire. The lead frame 230 and the light emitting element 204 are surrounded by molded transparent mold resin R of a bullet type.

The light emitting element for indication 212 formed by the LED chip is desirably bonded to the bottom surface of the mold resin R of the bullet type by an adhesive. Naturally, the adhesive is desirably formed by a light transmissive material.

Light emitted by the light emitting element for indication 212 is induced into the optical fiber Fb for light reception through the mold resin R of the bullet type.

With the light receiving member 372D shown in FIG. 13, it is possible to dispose the light receiving element 204 in a state in which the light receiving element 204 is close to the end of the optical fiber Fb for light reception. Therefore, it is possible to secure high light reception performance.

A light blocking member or a reflecting member may be disposed by, for example, being applied to the lower surface and the side surface of the light receiving element 204. The mold resin R of the bullet type is desirably surrounded by a material that reflects light or a material that can electrically shield the mold resin R. For example, metal is vapor-deposited on the outer surface of the mold resin R of the bullet type.

When the light receiving member 372 includes not only the light receiving element 204 but also the light emitting element for indication 212, the light receiving element 204 cannot distinguish whether the light emitted by the light emitting element for indication 212 is detection light received from the pair of light projecting heads 100 or display light (visible light) of the light emitting element for indication 212. It is desirable to take measures for making it possible to distinguish the detection light of the light projecting head 100 and the display light (the visible light) of the light emitting element for indication 212.

Specifically, by adopting means for, for example, varying a wavelength, varying light emission timing, or varying a light emission frequency, it is desirable to carry out separation in terms of wavelength of light, in terms of light emission timing, or in terms of a light mission frequency or carry out separation in terms of wavelength of light and separation in terms of light emission timing or in terms of a light emission frequency in combination. As the means for varying wavelength, as explained with reference to FIGS. 11 and 12, it is desirable to provide a physical filter.

Figure 14:
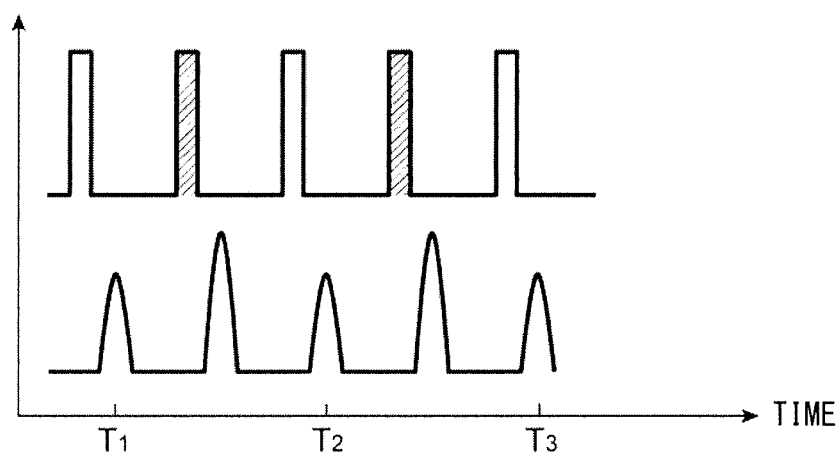
FIG. 14 is a diagram for explaining an example in which light emission timing is varied in order to make it possible to distinguish detection light of the light projecting head and display light of a light emitting element for display.

FIG. 14 is a diagram for explaining an example in which light emission timing is varied. The light emitting element for indication 212 is caused to emit light between adjacent two light emission pulses for detection of the light emitting element 104. In FIG. 14, the light emitting element for indication 212 is identified by adding hatching to a light emission pulse.

When detection timings of the light receiving element 110 are represented as T1, T2, and T3, the light emitting element for indication 212 emits light among the detection timings T1, T2, and T3. Therefore, the light receiving element 110 can regularly receive the light emission pulse for detection.

Figure 15:
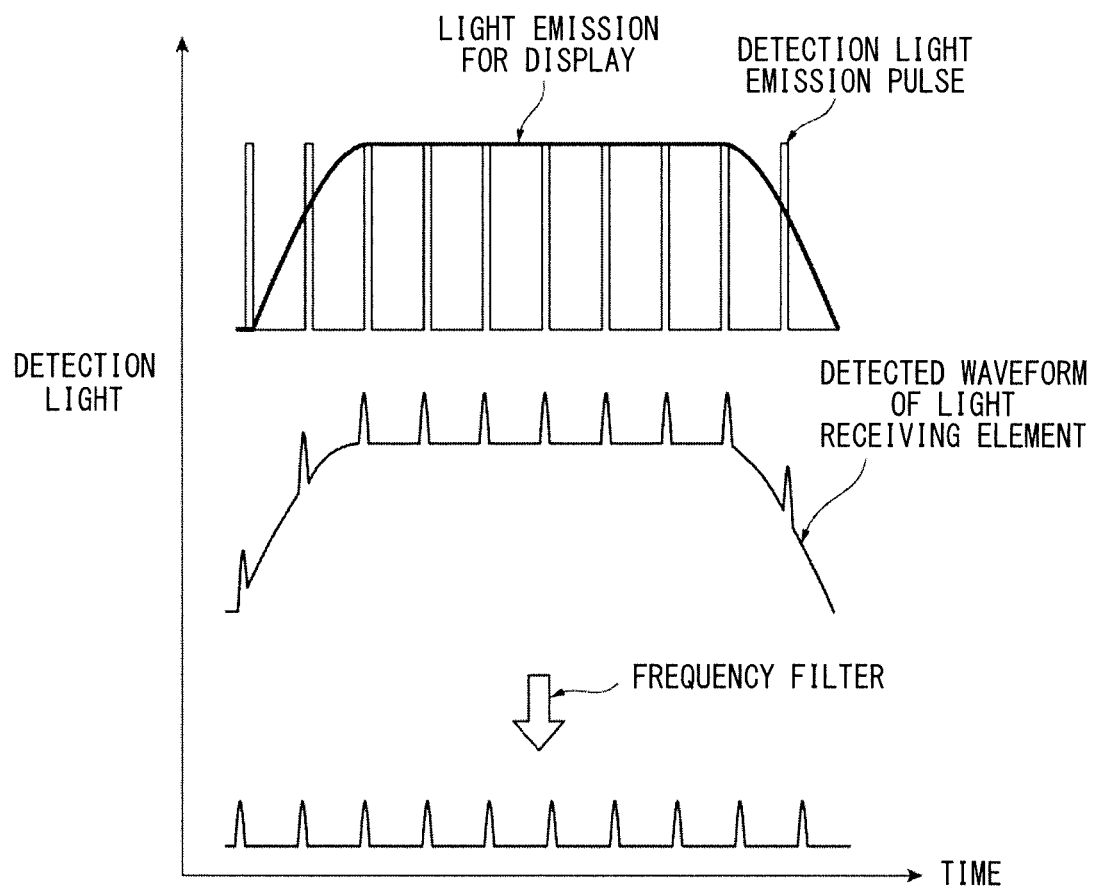
FIG. 15 is a diagram for explaining a method of separating the detection light of the light projecting head and the display light of the light emitting element for display in terms of a light emission frequency in order to make it possible to distinguish the detection light of the light projecting head and the display light of the light emitting element for display.

FIG. 15 is a diagram for illustratively explaining a method of separation in terms of a light emission frequency. The light emission pulse for detection of the light emitting element 104 repeats ON/OFF at predetermined timing. Even if light of the light emitting element for indication 212 is superimposed on the light emission pulse for detection, the light receiving element 110 can receive light in a state in which a waveform of the light pulse for detection is maintained. Consequently, by filtering an output waveform of the light receiving element 110 with a frequency filter (high-pass), it is possible to extract only the detection light emitted by the light emitting element 104.

Frequency domains used in detection and display are segmented by reducing the frequency of the light emission waveform of the light emitting element for indication 212 in the filtering explained with reference to FIG. 15. However, conversely to the example shown in FIG. 15, the frequency domains may be segmented by increasing the frequency of the light emission waveform of the light emitting element for indication 212.

What is claimed is:

1. A photoelectric sensor comprising:
a light emitting element configured to project detection light toward a detection region;
a light receiving element configured to receive the detection light reflected from the detection region;
a connecting section for light projection to which a light propagation member for light projection optically coupled to the light emitting element is connected;
a connecting section for light reception to which a light propagation member for light reception optically coupled to the light receiving element is connected;
a signal generating unit configured to compare a light reception signal generated by the light receiving element and a threshold and generate a detection signal indicating a result of the comparison;
a first light emitting element for indication which is optically coupled to the connecting section for light reception and projects an indication light in response to the light reception signal; and
a mounting substrate which the first light emitting element for indication and the light receiving element are mounted on or above, and each of the first light emitting element for indication and the light receiving element provided on the mounting substrate being positioned to the connecting section for light reception or one of the first light emitting element for indication and the light receiving element being positioned to the connecting section for light reception via the other.

2. The photoelectric sensor according to claim 1, wherein the light receiving element and the first light emitting element for indication are disposed on a light receiving surface of the light receiving element, the light receiving element being a main light receiving element facing the connecting section for light reception.

3. The photoelectric sensor according to claim 2, wherein the light receiving element and the first light emitting element for indication are disposed on the main light receiving surface of the light receiving element in a vertical arrangement direction.

4. The photoelectric sensor according to claim 1, wherein the light receiving element and the first light emitting element for indication are disposed on the main light receiving surface of the light receiving element in a lateral arrangement relation.

5. The photoelectric sensor according to claim 3, wherein the light receiving element is disposed on the mounting substrate side, and the first light emitting element for indication is disposed on the connecting section for light reception side.

6. The photoelectric sensor according to claim 3, wherein the first light emitting element for indication is disposed on the mounting substrate side, and the light receiving element is disposed on the connecting section for light reception side.

7. The photoelectric sensor according to claim 2, wherein an area of the main light receiving surface of the light receiving element is a plane area larger than the first light emitting element for indication.

8. The photoelectric sensor according to claim 1, wherein both of the light receiving element and the first light emitting element for indication are provided on the mounting substrate, and the light receiving element and the first light emitting element for indication are surrounded by a common transparent member.

9. The photoelectric sensor according to claim 1, wherein a filter member having a wavelength-selective light absorbing ability is provided between the light receiving element and the first light emitting element for indication.

10. The photoelectric sensor according to claim 1, wherein a thin film having a light reflecting ability is provided between the light receiving element and the first light emitting element for indication.

11. The photoelectric sensor according to claim 1, wherein the light receiving element and the first light emitting element for indication are surrounded by a common resin mold.

12. The photoelectric sensor according to claim 11, wherein the light receiving element includes a photodiode bare chip, the photodiode bare chip being provided on the mounting substrate.

13. The photoelectric sensor according to claim 12, wherein the photodiode bare chip is molded by resin.

14. The photoelectric sensor according to claim 1, wherein the first light emitting element for indication includes an LED bare chip, the LED bare chip being provided on the mounting substrate.

15. The photoelectric sensor according to claim 14, wherein the LED bare chip is molded by resin.

16. The photoelectric sensor according to claim 1, wherein
the first light emitting element for indication is provided on the mounting substrate,
the light receiving element is mounted on the mounting substrate via a lead frame,
the light receiving element is surrounded by mold resin, and
the first light emitting element for indication is optically coupled to the connecting section for light reception via the mold resin of the light receiving element.

17. The photoelectric sensor according to claim 1, further comprising an element holder, wherein
the element holder includes:
a fiber hole for light projection into which the light propagation member for light projection is inserted;
a fiber hole for light reception into which the light propagation member for light reception is inserted;
a light-projecting-unit housing unit configured to house the light projecting unit; and
a light-receiving-unit housing unit configured to house the light receiving unit.

18. The photoelectric sensor according to claim 1, further comprising:
a second light emitting element for indication disposed adjacent to the light emitting element; and
a mounting substrate for light projection on which the light emitting element and the second light emitting element for display are provided, wherein
both of the second light emitting element for display and the light emitting element are surrounded by common resin mold in a state in which the optical coupling to the connecting section for light projection is maintained.

19. The photoelectric sensor according to claim 18, wherein the second light emitting element for indication is disposed on a far side from the light receiving element.

20. A photoelectric sensor comprising:
a light emitting element configured to project detection light toward a detection region;
a light receiving element configured to receive the detection light reflected from the detection region;
a connecting section for light projection to which a light propagation member for light projection optically coupled to the light emitting element is connected;
a connecting section for light reception to which a light propagation member for light reception optically coupled to the light receiving element is connected;
a signal generating unit configured to compare a light reception signal generated by the light receiving element and a threshold and generate a detection signal indicating a result of the comparison;
a second light emitting element for indication which is optically coupled to the connecting section for light projection and projects an indication light in response to the light reception signal; and
a mounting substrate which the second light emitting element for indication and the light emitting element are mounted on or above, and each of the second light emitting element for indication and the light emitting element provided on the mounting substrate being positioned to the connecting section for light projection or one of the second light emitting element for indication and the light emitting element being positioned to the connecting section for light projection via the other.

* * * * *